United States Patent
Isaka et al.

(10) Patent No.: US 10,882,267 B2
(45) Date of Patent: Jan. 5, 2021

(54) SEALING PIN, METHOD OF MANUFACTURING ASSEMBLY, AND METHOD OF MANUFACTURING GAS SENSOR

(71) Applicant: NGK INSULATORS, LTD., Aichi (JP)

(72) Inventors: Kenji Isaka, Nagoya (JP); Nobukazu Ikoma, Nagoya (JP); Koji Egawa, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 53 days.

(21) Appl. No.: 15/938,296

(22) Filed: Mar. 28, 2018

(65) Prior Publication Data

US 2018/0281331 A1 Oct. 4, 2018

(30) Foreign Application Priority Data

Mar. 31, 2017 (JP) .................... 2017-070977

(51) Int. Cl.
| | |
|---|---|
| *B30B 15/06* | (2006.01) |
| *B30B 9/00* | (2006.01) |
| *G01N 27/407* | (2006.01) |

(52) U.S. Cl.
CPC ............. *B30B 15/065* (2013.01); *B30B 9/00* (2013.01); *G01N 27/4078* (2013.01); *G01N 27/407* (2013.01)

(58) Field of Classification Search
CPC .... B30B 15/065; B30B 9/00; G01N 27/4078; G01N 27/407
See application file for complete search history.

(56) References Cited

U.S. PATENT DOCUMENTS

| | | | | |
|---|---|---|---|---|
| 9,188,576 B2* | 11/2015 | Hirata | ............... | G01N 27/4078 |
| 9,823,230 B2* | 11/2017 | Hirata | ............... | G01M 15/102 |
| 10,288,581 B2* | 5/2019 | Isaka | ............... | G01N 33/0037 |
| 2006/0174690 A1 | 8/2006 | Nisho et al. | | |
| 2015/0268187 A1 | 9/2015 | Adachi et al. | | |
| 2016/0273944 A1 | 9/2016 | Hattori et al. | | |

FOREIGN PATENT DOCUMENTS

| | | |
|---|---|---|
| DE | 37 01 934 A1 | 8/1988 |
| EP | 2 921 851 A1 | 9/2015 |
| JP | 2012-242112 A | 12/2012 |
| JP | 2015-178988 A | 10/2015 |
| JP | 2016173360 A | 9/2016 |
| JP | 2017133911 A | 8/2017 |

OTHER PUBLICATIONS

Extended European Search Report received in corresponding European Application No. 18164390.9 dated Jul. 26, 2018.
Japanese Office Action received in corresponding Japanese Application No. 2017-070977 dated Sep. 15, 2020.

* cited by examiner

*Primary Examiner* — John C Hong
(74) *Attorney, Agent, or Firm* — Mattingly & Malur, PC

(57) ABSTRACT

A sealing pin includes a distal end portion that is inserted into the cylindrical body and that presses the sealant in the sealing step and a slit that is provided to allow the sealing pin to avoid the sensor element when the sealing pin is inserted into the cylindrical body, that extends through the distal end portion in a direction perpendicular to an axial direction of the distal end portion, and that has a width larger than a thickness of the sensor element.

6 Claims, 6 Drawing Sheets

MEASUREMENT
-OBJECT GAS →

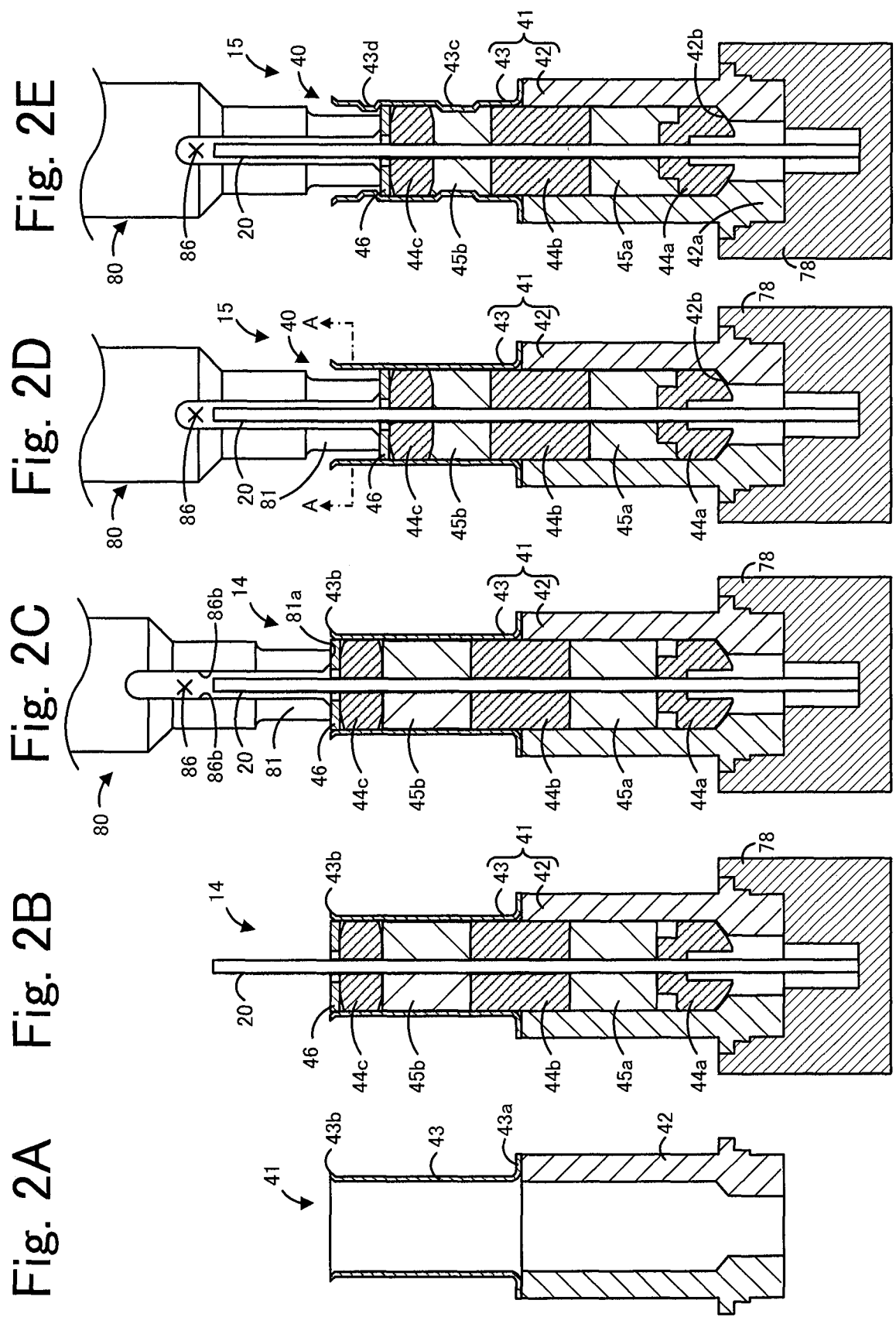

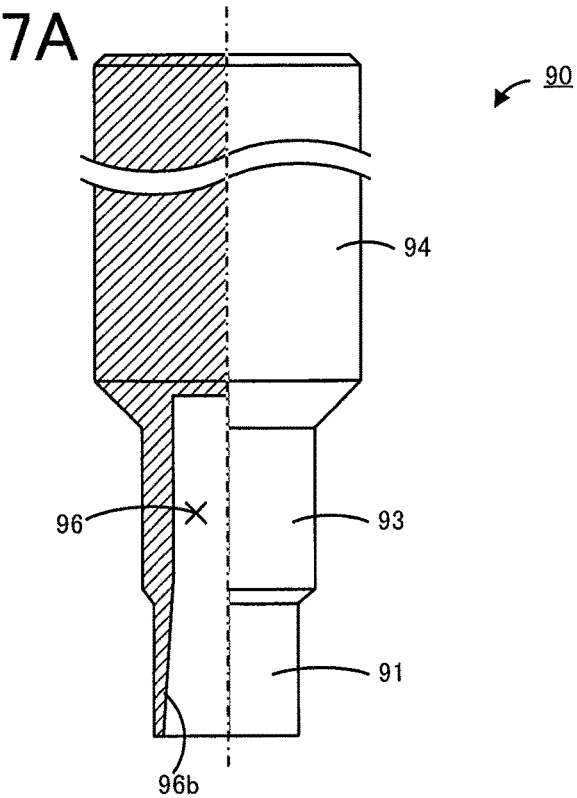
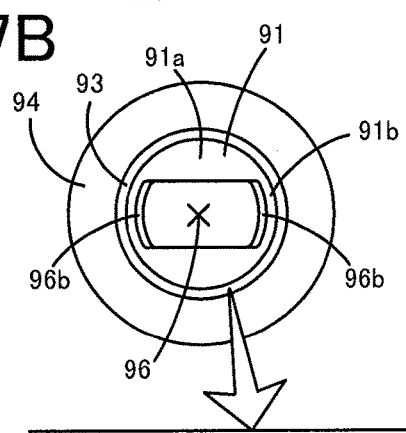
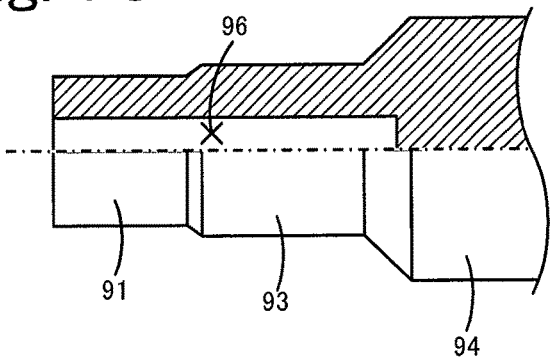
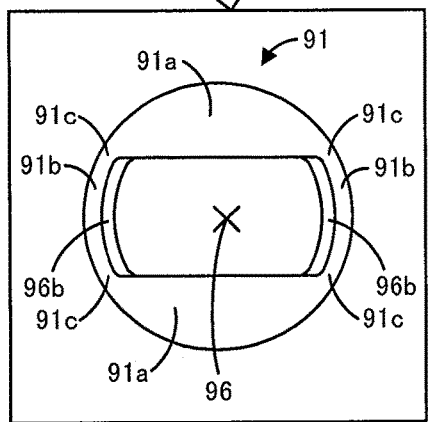

SEALING PIN, METHOD OF MANUFACTURING ASSEMBLY, AND METHOD OF MANUFACTURING GAS SENSOR

BACKGROUND OF THE INVENTION

1. Field of the Invention

The present invention relates to a sealing pin, a method of manufacturing an assembly, and a method of manufacturing a gas sensor.

2. Description of the Related Art

Hitherto, there is known, as a gas sensor that detects a specific gas concentration in a measurement-object gas, a structure including an assembly having a sensor element and an element sealing body that seals and fixes the sensor element (for example, see PTL 1). PTL 1 describes the following method as a method of manufacturing the assembly. First, a cylindrical main metal fitting and an inner cylinder are welded to one another to obtain a complex body. Then, the sensor element is inserted to penetrate through the inside of a metal ring, a ceramic supporter, and a green compact, and the resultant is inserted into the complex body from the inner cylinder side. Then, the metal ring and the main metal fitting are pressed toward one another and hence the green compact is compressed. Thus the inside of the main metal fitting and the inside of the inner cylinder are sealed.

CITATION LIST

Patent Literature

PTL 1: JP 2015-178988 A

SUMMARY OF THE INVENTION

To press a sealant such as the green compact inserted into a cylindrical body, a sealing pin may be inserted into the inner cylinder and the sealing pin may provide the press. FIG. 6A and FIG. 6B are an explanatory view of a sealing step using a sealing pin 90. For example, first, supporters 144a to 144c, sealants 145a and 145b, a metal ring 146, and a sensor element 120 are inserted into a cylindrical body obtained by welding a main metal fitting 142 and an inner cylinder 143 to one another (FIG. 6A). Then, the sealing pin 90 is inserted into the inner cylinder 143 in the axial direction from the upper side, presses the sealants 145a and 145b via the metal ring 146, and hence compresses the sealants 145a and 145b (FIG. 6B). FIG. 7A to 7C are a three-view drawing of the sealing pin 90. FIG. 7A, FIG. 7B, and FIG. 7C illustrate the sealing pin 90 in FIG. 6A and FIG. 6B when viewed from the left side, lower side, and near side of the sheet of drawing. FIG. 7A and FIG. 7C are partial section views of the sealing pin 90. As illustrated in FIG. 6A and FIG. 6B and FIG. 7A to 7C, the sealing pin 90 includes a distal end portion 91 that is inserted into the inner cylinder 143, a first large-diameter portion 93 having a diameter larger than that of the distal end portion 91, and a second large-diameter portion 94 having a diameter larger than that of the first large-diameter portion 93. An insertion hole 96 is formed at the sealing pin 90. The insertion hole 96 is open at a distal end surface (lower end surface in FIG. 6A and FIG. 6B and FIG. 7A) of a distal end portion 91 of the sealing pin 90. When the sealing pin 90 is inserted into the inner cylinder 143, an upper side of the sensor element 120 is inserted into the insertion hole 96. Accordingly, the sealing pin 90 can press the metal ring 46 while avoiding the sensor element 120. A view in an additional box in FIG. 6B is a partial section view, perpendicular to the axial direction, of the distal end portion 91 of the sealing pin 90 and the inner cylinder 143 during the compression. As illustrated in the partial section view in the additional box in the FIG. 6B, the insertion hole 96 has a shape having a long-side direction and a short-side direction in a section perpendicular to the axial direction of the sealing pin 90. Hence, the distal end portion 91 has thick portions 91a, 91a facing one another in the short-side direction of the opening of the insertion hole 96, and thin portions 91b, 91b facing one another in the long-side direction of the opening of the insertion hole 96. Also, among side surfaces of the insertion hole 96, side surfaces 96b, 96b facing one another in the left-right direction in FIG. 7A are inclined so that the insertion hole 96 becomes larger as the insertion hole 96 extends to the distal end of the distal end portion 91, from an intermediate position of the first large-diameter portion 93 toward the distal end of the distal end portion 91.

However, when the sealants 145a and 145b are pressed by using the sealing pin 90, there has been a problem in which the sealing pin 90 is likely broken. Specifically, there has been a problem in which a stress during the press is likely concentrated at a connection portion 91c (see the portion in the additional box in FIG. 7B) between the thick portion 91a and the thin portion 91b of the distal end surface of the distal end portion 91, and the connection portion 91c is likely broken. Owing to this, a sealing pin that is more unlikely broken has been desired.

The present invention is made to address the problems, and a main object of the invention is to cause a sealing pin to be more unlikely broken.

The present invention employs the following measures to attain the above-described main object.

A sealing pin according to the present invention is a sealing pin that is used in a sealing step when an assembly is manufactured, the assembly including a cylindrical body, a sensor element having a long plate shape and penetrating through inside of the cylindrical body in an axial direction, and a sealant providing sealing between an inner peripheral surface of the cylindrical body and the sensor element, the sealing step pressing the sealant in the axial direction and hence compressing the sealant, the sealing pin including:

a distal end portion that is inserted into the cylindrical body and that presses the sealant in the sealing step; and a slit that is provided to allow the sealing pin to avoid the sensor element when the sealing pin is inserted into the cylindrical body, that extends through the distal end portion in a direction perpendicular to an axial direction of the distal end portion, and that has a width larger than a thickness of the sensor element.

The sealing pin has the slit to avoid the sensor element in the sealing step. The slit extends through the distal end portion in the direction perpendicular to the axial direction of the distal end portion unlike, for example, the insertion hole 96 of the sealing pin 90 illustrated in FIG. 7A to 7C. Hence, with the sealing pin according to the present invention, a portion like the thin portion 91b of the sealing pin 90 can be eliminated, and a portion at which a stress is likely concentrated, such as the connection portion 91c, can be eliminated. Hence, the sealing pin according to the present invention is more unlikely broken in the sealing step as compared with, for example, the sealing pin 90.

In the sealing pin according to the present invention, the slit may have a bottom surface, the bottom surface having a curved surface. For example, when the bottom surface is a flat surface, a stress may be likely concentrated at the boundary between the bottom surface and a side surface of the slit. However, since the bottom surface is the curved surface, such stress concentration can be suppressed. Accordingly, the sealing pin is more unlikely broken.

In the sealing pin according to the present invention, the sealing pin may further include a first large-diameter portion that is connected to the distal end portion, and that has a diameter larger than a diameter of the distal end portion; and a step surface between the distal end portion and the large-diameter portion may have a rising portion rising from the distal end portion to the large-diameter portion, the rising portion having a curved surface. Hence, as compared with, for example, a case where the step surface has a shape rising perpendicularly from an outer peripheral surface of the distal end portion, a stress is unlikely concentrated at the rising portion. Accordingly, the sealing pin is more unlikely broken.

In the sealing pin according to the present invention, a corner portion of a distal end of the distal end portion facing the slit may be chamfered. Accordingly, as compared with a case where the corner portion of the distal end portion is not chamfered, breakage of the sensor element by the distal end portion can be suppressed when the sensor element is inserted into the slit in the sealing step.

In the sealing pin according to the present invention, the sealing pin may further include a second large-diameter portion having a diameter larger than the diameter of the distal end portion; and the slit may have a depth from the distal end portion to the second large-diameter portion, and a bottom surface of the slit may be located in the second large-diameter portion. Accordingly, since the diameter of the portion of the sealing pin that receives a stress applied to a portion near a bottom portion of the slit is large, breakage of the portion can be suppressed. In this case, the sealing pin according to the present invention may have the above-described first large-diameter portion, and the second large-diameter portion may have a diameter larger than the diameter of the first large-diameter portion. Alternatively, the second large-diameter portion may also serve as the first large-diameter portion.

A method of manufacturing an assembly according to the present invention is a method of manufacturing an assembly including a cylindrical body, a sensor element having a long plate shape and penetrating through inside of the cylindrical body in an axial direction, and a sealant providing sealing between an inner peripheral surface of the cylindrical body and the sensor element, the method including:

a sealing preparation step of inserting the sensor element to penetrate through the inside of the cylindrical body in the axial direction, arranging the sealant between the inner peripheral surface of the cylindrical body and the sensor element, and hence obtaining a pre-sealing assembly; and a sealing step of inserting a distal end portion of a sealing pin into the cylindrical body in the axial direction, pressing the sealant, and hence compressing the sealant and providing the sealing between the inner peripheral surface of the cylindrical body and the sensor element, in which the sealing pin has a slit that is provided to allow the sealing pin to avoid the sensor element when the sealing pin is inserted into the cylindrical body, that extends through the distal end portion in a direction perpendicular to an axial direction of the distal end portion, and that has a width larger than a thickness of the sensor element.

With the method of manufacturing the assembly, the sealing pin having the slit extending through the distal end portion in the direction perpendicular to the axial direction of the distal end portion is used like the above-described sealing pin according to the present invention, the sealing pin is unlikely broken in the sealing step. Also, since the sealing pin is unlikely broken, for example, when the sealing step is continuously performed and a plurality of assemblies are manufactured, the frequency of replacement of the sealing pin can be decreased and the assemblies can be efficiently manufactured. The sealing pin that is used in the method of manufacturing the assemblies can employ any of the aforementioned various aspects of the sealing pin according to the present invention.

A method of manufacturing a gas sensor according to the present invention includes a step of manufacturing a gas sensor including an assembly by using the assembly manufactured by the aforementioned method of manufacturing the assembly according to the present invention. Accordingly, the method of manufacturing the gas sensor can provide an advantageous effect similar to that of the above-described method of manufacturing the assembly according to the present invention, for example, an advantageous effect that the sealing pin is unlikely broken in the sealing step.

BRIEF DESCRIPTION OF THE DRAWINGS

FIGS. 2A to 2E provide section views schematically illustrating a manufacturing process of an assembly 15.

FIGS. 7A to 7C are a three-view drawing of the sealing pin 90 according to the comparative example.

DETAILED DESCRIPTION OF THE INVENTION

Figure 1:
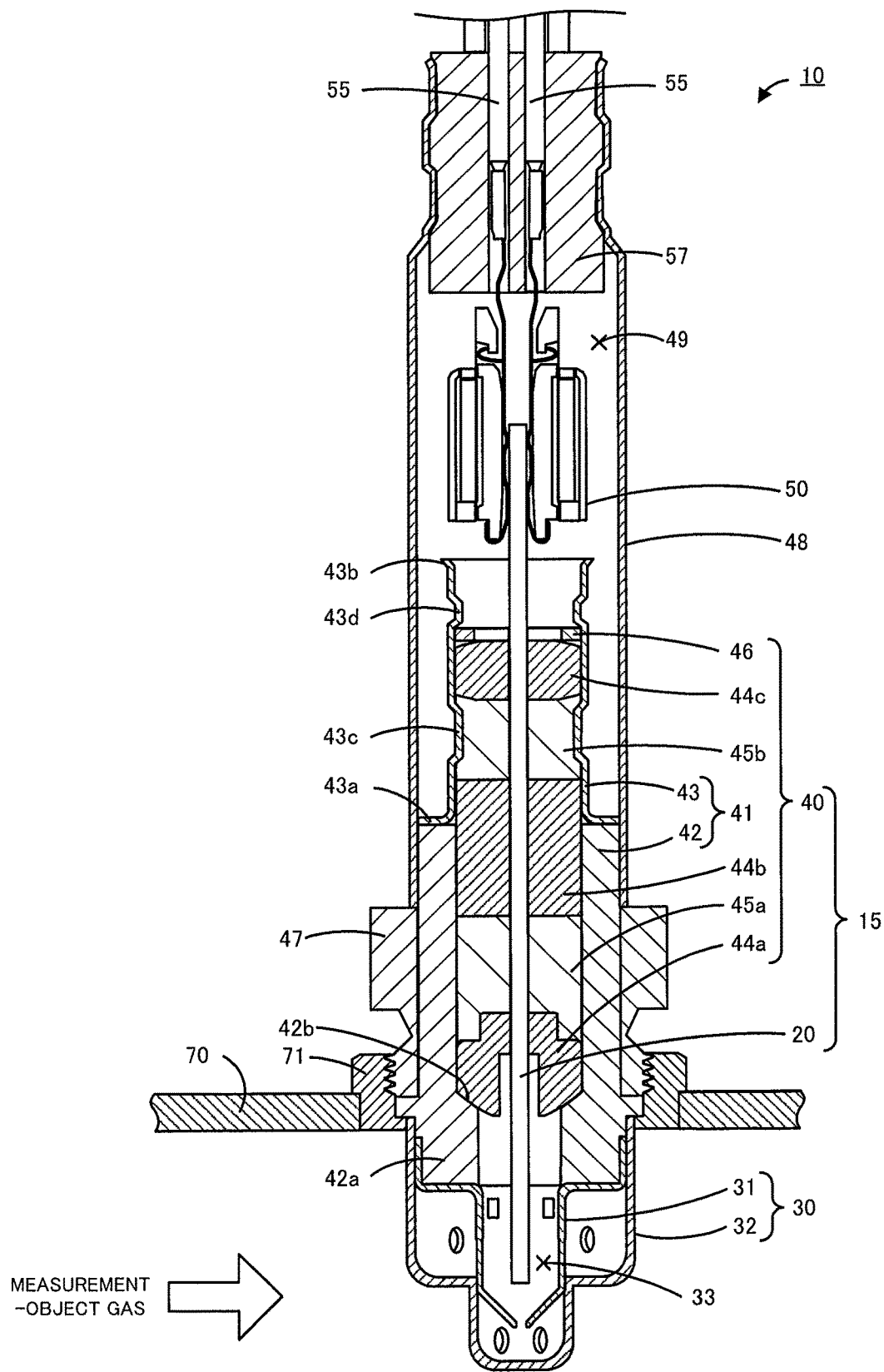
FIG. 1 is a vertical section view illustrating a state in which a gas sensor 10 is attached to a pipe 70.

An embodiment of the present invention is described below with reference to the drawings. FIG. 1 is a vertical section view illustrating a gas sensor 10 which is an embodiment of a gas sensor manufactured by a manufacturing method according to the present invention. FIG. 1 illustrates a state in which the gas sensor 10 is attached to a pipe 70.

As illustrated in FIG. 1, the gas sensor 10 includes an assembly 15, a protection cover 30, a nut 47, an outer cylinder 48, a connector 50, a lead wire 55, and a rubber cap 57. The assembly 15 includes a sensor element 20 and an element sealing body 40. The gas sensor 10 is attached to, for example, a pipe 70, such as an exhaust gas pipe of a vehicle, and is used for measuring the concentration of a specific gas (specific gas concentration), such as NOx or $O_2$, contained in an exhaust gas serving as a measurement-object gas. In this embodiment, the gas sensor 10 measures an NOx concentration as the specific gas concentration.

The sensor element 20 is an element having a thin and long plate shape. The sensor element 20 is formed by stacking, for example, six oxygen-ion-conductive solid electrolyte layers of, for example, zirconia ($ZrO_2$). An end portion (lower end in FIG. 1) of the sensor element 20 at the protection cover 30 side is expressed as a distal end, and an end portion (upper end in FIG. 1) of the sensor element 20 at the connector 50 side is expressed as a proximal end. The length of the sensor element 20 in the up-down direction in FIG. 1 is referred to as a length of the sensor element 20, the length of the sensor element 20 in the left-right direction in FIG. 1 is referred to as a thickness of the sensor element 20, and the length of the sensor element 20 in the direction perpendicular to the up-down and left-right directions in FIG. 1 is referred to as a width of the sensor element 20. The dimensions of the sensor element 20 satisfy length>width>thickness. Electrodes (not illustrate) for applying a voltage to the sensor element 20 and taking an electromotive force or current generated in accordance with the concentration of the gas component to be detected by the sensor element 20 are formed on a front surface and a back surface of the proximal end of the sensor element 20. The electrodes are electrically connected to an electrode (not illustrated) in the distal end of the sensor element 20 via a circuit in the sensor element 20. The sensor element 20 may include a porous protection layer that covers at least part of a portion of the sensor element 20 exposed to the inside of an element chamber 33.

The element sealing body 40 is a member that seals and fixes the sensor element 20. The element sealing body 40 includes a cylindrical body 41 including a main metal fitting 42 and an inner cylinder 43, supporters 44a to 44c, sealants 45a and 45b, and a metal ring 46. The sensor element 20 is located on the central axis of the element sealing body 40, and penetrates through the element sealing body 40 in the axial direction (up-down direction in FIG. 1).

The main metal fitting 42 is a cylindrical metal member. A portion at a lower side of the main metal fitting 42 is a thick portion 42a having an inner diameter smaller than that of an upper side. The protection cover 30 is attached to the main metal fitting 42 at the same side as the distal end (lower side in FIG. 1) of the sensor element 20. An upper end of the main metal fitting 42 is welded to a lower end of the inner cylinder 43. The thick portion 42a has an inner diameter smaller than that of the upper side of the main metal fitting 42. Hence a portion of an inner peripheral surface of the thick portion 42a serves as a bottom surface 42b which is a step surface. The bottom surface 42b presses the supporter 44a so that the supporter 44a does not protrude out to the lower side in FIG. 1. The material of the main metal fitting 42 is stainless steel of, for example, a Cr—Fe-based alloy (for example, SUS430).

The inner cylinder 43 is a cylindrical metal member thinner than the main metal fitting 42. The inner cylinder 43 has a flange portion 43a at the lower end of the inner cylinder 43, and an expanded pipe portion 43b at an upper end of the inner cylinder 43. The inner diameter of the expanded pipe portion 43b increases toward a distal end thereof. The inner cylinder 43 is attached to the main metal fitting 42 at the same side as the proximal end (upper side in FIG. 1) of the sensor element 20. A lower surface of the flange portion 43a of the inner cylinder 43 is welded to the main metal fitting 42. The inner cylinder 43 and the main metal fitting 42 are coaxially welded and fixed. Also, the inner cylinder 43 has a reduced-diameter portion 43c for pressing the sealant 45b in a direction toward the central axis of the inner cylinder 43, and a reduced-diameter portion 43d for pressing the supporters 44a to 44c and the sealants 45a and 45b downward in FIG. 1 via the metal ring 46. The inner diameter of a portion of the inner cylinder 43 other than the flange portion 43a, the expanded pipe portion 43b, and the reduced-diameter portions 43c and 43d is substantially the same as the inner diameter of a portion of the main metal fitting 42 other than the thick portion 42a. The material of the inner cylinder 43 is stainless steel of, for example, a Cr—Fe-based alloy (for example, SUS430).

The supporters 44a to 44c and the sealants 45a and 45b are arranged between an inner peripheral surface of the cylindrical body 41 and the sensor element 20. The supporters 44a to 44c are members made of ceramics, for example, alumina, steatite, zirconia, or spinel. As illustrated in FIG. 1, an upper surface of the supporter 44c is inclined so that the outer side in the radial direction is located downward in FIG. 1. In other words, the upper surface of the supporter 44c is inclined so as to be separated from the metal ring 46 more at the outer side in the radial direction. The sealants 45a and 45b are, for example, green compacts formed by shaping powder. The material of the green compacts may be talc, alumina powder, or ceramic powder of such as boron nitride. The sealants 45a and 45b may each contain at least one of these. The area between the supporters 44a and 44b is filled with the sealant 45a. The sealant 45a is sandwiched and pressed by the supporters 44a and 44b from both sides (upper and lower sides). The area between the supporters 44b and 44c is filled with the sealant 45b. The sealant 45b is sandwiched and pressed by the supporters 44b and 44c from both sides (upper and lower sides). The supporters 44a to 44c and the sealants 45a and 45b are sandwiched and pressed from the upper and lower sides by a set of the reduced-diameter portion 43d and the metal ring 46, and the bottom surface 42b of the thick portion 42a of the main metal fitting 42. With the pressing forces from the reduced-diameter portions 43c and 43d, the sealants 45a and 45b are compressed between the cylindrical body 41 and the sensor element 20. Hence, the sealants 45a and 45b provide sealing between the element chamber 33 in the protection cover 30 and a space 49 in the outer cylinder 48, and fix the sensor element 20. The material of the metal ring 46 may be stainless steel, such as a Cr—Ni—Fe-based alloy (for example, SUS304).

As illustrated in FIG. 1, the protection cover 30 includes an inner protection cover 31 having a bottomed cylindrical shape that covers the distal end side (lower end side in FIG. 1) of the sensor element 20, and an outer protection cover 32 having a bottomed cylindrical shape that covers the inner protection cover 31. A plurality of holes are formed in the inner protection cover 31 and the outer protection cover 32. The holes allow the measurement-object gas to circulate in the protection cover 30. The element chamber 33 is formed as a space surrounded by the inner protection cover 31. The distal end surface (lower end surface in FIG. 1) of the sensor element 20 is arranged in the element chamber 33. The protection cover 30 is welded to the main metal fitting 42. The material of the protection cover 30 may be stainless steel, such as a Cr—Ni—Fe-based alloy (SUS301, SUS304, SUS310, etc.).

The nut 47 is fixed to the outer side of the main metal fitting 42 coaxially with the main metal fitting 42. The nut 47 has an external thread portion on an outer peripheral surface of the nut 47. The external thread portion is inserted into a fixture member 71 that is welded to the pipe 70 and that has an internal thread portion on an inner peripheral surface of the fixture member 71. Accordingly, the gas sensor 10 can be fixed to the pipe 70 in a state in which the lower end side of the sensor element 20 and the portion of the protection cover 30 of the gas sensor 10 protrude into the pipe 70.

The outer cylinder 48 is a cylindrical metal member. The outer cylinder 48 covers the inner cylinder 43, the upper end side of the sensor element 20, and the connector 50. An upper portion of the main metal fitting 42 is inserted into the outer cylinder 48. A lower end of the outer cylinder 48 is welded to the main metal fitting 42. A plurality of lead wires 55 connected to the connector 50 are extended outside from an upper end of the outer cylinder 48. The connector 50 contacts a conduction electrode (not illustrated) disposed on a surface at the upper end side (left and right surfaces in FIG. 1) of the sensor element 20 and is electrically connected to the conduction electrode. The lead wires 55 are electrically connected to respective electrodes in the sensor element 20 via the connector 50. The gap between the outer cylinder 48 and the lead wires 55 is sealed with the rubber cap 57. The space 49 in the outer cylinder 48 is filled with a reference gas (for example, the air). The reference gas serves as a reference for detection of the specific gas concentration. The upper end side of the sensor element 20 is arranged in the space 49. The outer cylinder 48 also has a role of protecting the upper end side of the sensor element 20.

Next, an example of a method of manufacturing the gas sensor 10 configured as described above is described below. First, a method of manufacturing the assembly 15 of the gas sensor 10 is described below. A method of manufacturing the assembly 15 according to this embodiment includes:

a sealing preparation step of inserting the sensor element 20 to penetrate through the inside of the cylindrical body 41 in the axial direction, arranging the sealants 45*a* and 45*b* between the inner peripheral surface of the cylindrical body 41 and the sensor element 20, and hence obtaining a pre-sealing assembly 14; and a sealing step of inserting the distal end portion 81 of the sealing pin 80 into the cylindrical body 41 in the axial direction, pressing the sealants 45*a* and 45*b*, hence compressing the sealants 45*a* and 45*b*, and providing sealing between the inner peripheral surface of the cylindrical body 41 and the sensor element 20.

Figure 3A:
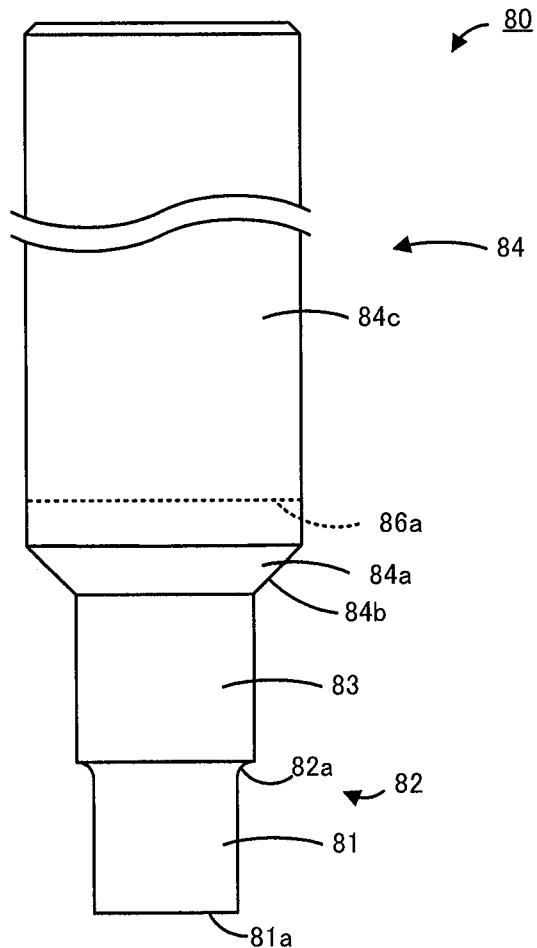
FIGS. 3A to 3C are a three-view drawing of a sealing pin 80.
Figure 3B:
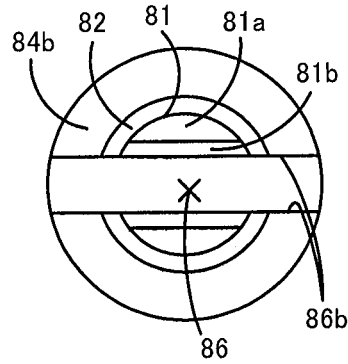
Figure 3C:
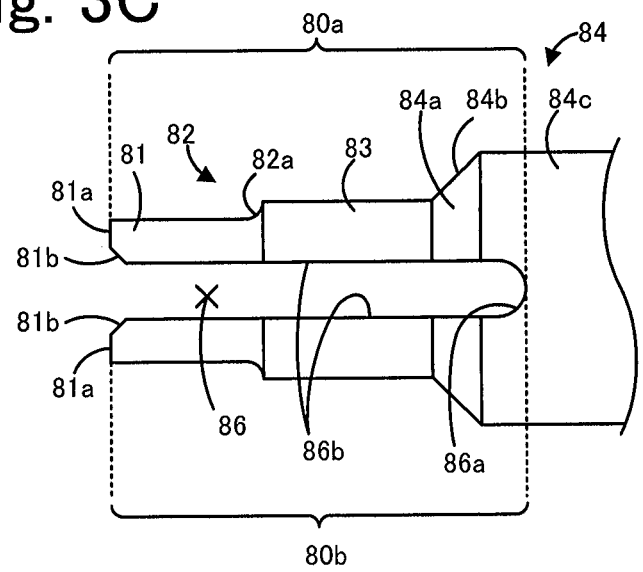
Figure 4:
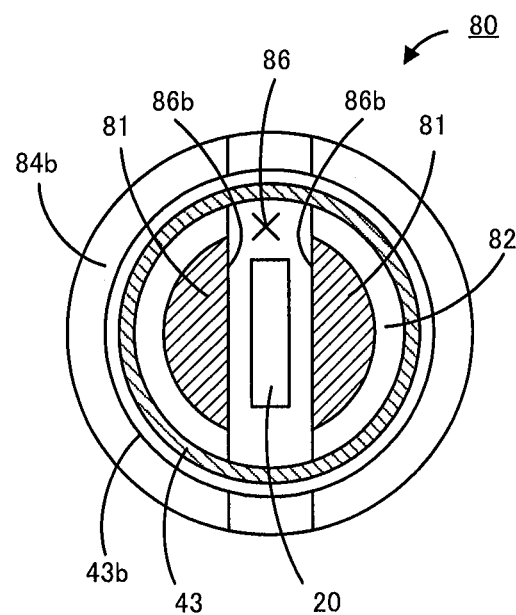
FIG. 4 is a section view taken along line A-A in FIG. 2D.

FIGS. 2A to 2E provide section views schematically illustrating a manufacturing process for the assembly 15. FIGS. 3A to 3C are a three-view drawing of a sealing pin 80. FIG. 3A, FIG. 3B, and FIG. 3C illustrate the sealing pin 90 in FIGS. 2A to 2E when viewed from the left side, lower side, and near side of the sheet of drawing. FIG. 4 is a section view taken along line A-A in FIG. 2D. First, the sealing preparation step is described. In the sealing preparation step, the cylindrical body 41 is prepared. Specifically, the main metal fitting 42 and the inner cylinder 43 are prepared and welded to one another to form the cylindrical body 41 (see FIG. 2A). The main metal fitting 42 and the inner cylinder 43 may be manufactured, for example, by forging. At this time, the flange portion 43*a* and the expanded pipe portion 43*b* are already formed at the inner cylinder 43, but the reduced-diameter portions 43*c* and 43*d* are not formed yet at the inner cylinder 43. The main metal fitting 42 and the inner cylinder 43 are welded to one another, for example, by resistance welding. Specifically, the main metal fitting 42 and the inner cylinder 43 are welded to one another by resistance welding, by coaxially mating the upper end of the main metal fitting 42 and the flange portion 43*a* of the inner cylinder 43 with one another by using a jig (not illustrated), and applying current to the contact surfaces. Accordingly, the main metal fitting 42 and the inner cylinder 43 are welded to one another at the contact surfaces, and form the cylindrical body 41.

Then, the sensor element 20 is inserted to penetrate through the metal ring 46, the supporter 44*c*, the sealant 45*b*, the supporter 44*b*, the sealant 45*a*, and the supporter 44*a* in that order, and the resultant is inserted into the cylindrical body 41 from the expanded pipe portion 43*b* side of the inner cylinder 43. Thus the pre-sealing assembly 14 is formed (FIG. 2B). At this time, the lower side (in this case, the main metal fitting 42 side) of the cylindrical body 41 is inserted into a fixture jig 78 and fixed. The sensor element 20 can be fabricated by a known method. For example, a plurality of unfired ceramic green sheets containing an oxygen-ion-conductive solid electrolyte such as zirconia as a ceramic component are prepared, and various patterns of electrodes etc. are formed on the ceramic green sheets. By stacking and bonding the plurality of ceramic green sheets, then cutting the ceramic green sheets to obtain an unfired body having the size of the sensor element 20, and firing the unfired body, the sensor element 20 is obtained. Holes are made in advance in the metal ring 46, the supporters 44*a* to 44*c*, and the sealants 45*a* and 45*b* along the central axis to allow the sensor element 20 to penetrate therethrough. As illustrated in FIG. 2B, in the pre-sealing assembly 14, the sensor element 20 penetrates through the inside of the cylindrical body 41 in the axial direction. Also, in the pre-sealing assembly 14, the supporters 44*a* to 44*c* and the sealants 45*a* and 45*b* are arranged between the inner peripheral surface of the cylindrical body 41 and the sensor element 20.

In the sealing preparation step, the sensor element 20 may be positioned so that the central axis of the cylindrical body 41 is further precisely aligned with the central axis of the sensor element 20 after the pre-sealing assembly 14 is manufactured. The sensor element 20 may be positioned in the left-right direction of the sensor element 20 (the thickness direction of the sensor element 20) and in the front-rear direction (the direction perpendicular to the up-down and left-right directions, the width direction of the sensor element 20) by holding the upper end of the sensor element 20 using a holder (not illustrated) and by adjusting the position of the holder. Also, the sensor element 20 may be positioned in the up-down direction. For example, although not illustrated, the fixture jig 78 may have a through hole at a portion right below the sensor element 20, a rod-shaped or plate-shaped positioning jig may be inserted into the through hole, and the positioning jig may be fixed at a predetermined position. The sensor element 20 may be positioned in the up-down direction with respect to the cylindrical body 41 by adjusting the up-down position of the positioning jig.

After the sealing preparation step is performed as described above, the sealing step using a sealing pin 80 is performed (FIG. 2C, FIG. 2D). The sealing pin 80 that is used in the sealing step is described now. As illustrated in FIG. 3A, the sealing pin 80 includes a distal end portion 81, a first large-diameter portion 83 connected to the distal end portion 81, a second large-diameter portion 84 connected to the first large-diameter portion 83, and a slit 86. The distal end portion 81, the first large-diameter portion 83, and the second large-diameter portion 84 are located coaxially with one another. The material of the sealing pin 80 may be, for example, an alloy tool steel material (JIS G4404), or more particularly, for example, a SKD material such as SKD11.

The distal end portion 81 has a substantially columnar shape. More specifically, the distal end portion 81 has a shape in which a portion corresponding to the slit 86 is removed from a column. Hence, the distal end portion 81 is divided into two portions by the slit 86. The distal end portion 81 is a portion that is inserted into the cylindrical body 41 and that presses the sealants 45*a* and 45*b* in the sealing step. Corner portions 81*b*, 81*b* facing the slit 86 at a distal end (left end in FIG. 3C) of the distal end portion 81 are chamfered. In this embodiment, the corner portions 81*b*,

81b are C chamfered; however, may be R chamfered. The distal end portion 81 has a first step surface 82 that is connected to the first large-diameter portion 83. The first step surface 82 has a curved rising portion 82a rising from the distal end portion 81 to the first large-diameter portion 83. In this embodiment, the rising portion 82a has a curved surface in such a manner that a shape in sectional view along the central axis of the sealing pin 80 is an arcuate shape. A portion of the distal end portion 81 other than the first step surface 82 has an outer diameter smaller than the inner diameter of the inner cylinder 43.

The first large-diameter portion 83 has a substantially columnar shape and has a diameter lather than that of the distal end portion 81. More specifically, the first large-diameter portion 83 has a shape in which the portion corresponding to the slit 86 is removed from a column, and is divided into two portions. The first large-diameter portion 83 has a diameter larger than that of the inner cylinder 43.

The second large-diameter portion 84 has a substantially columnar shape and has a reduced-diameter portion 84a and a columnar portion 84c. The columnar portion 84c has a diameter larger than those of the distal end portion 81 and the first large-diameter portion 83. The reduced-diameter portion 84a is a portion that connects the first large-diameter portion 83 with the columnar portion 84c, and has a diameter that decreases from the columnar portion 84c toward the first large-diameter portion 83. The reduced-diameter portion 84a has a truncated-cone shape. Hence, a second step surface 84b that is an outer peripheral surface of the reduced-diameter portion 84a has a shape with a straight line in sectional view along the central axis of the sealing pin 80.

The slit 86 is provided so that the sealing pin 80 avoids the sensor element 20 when the sealing pin 80 is inserted into the cylindrical body 41 in the sealing step. The slit 86 is formed from a distal end surface 81a of the distal end portion 81 in the axial direction of the sealing pin 80. A bottom surface 86a of the slit 86 is located in the columnar portion 84c of the second large-diameter portion 84. That is, the slit 86 has a depth from the distal end surface 81a of the distal end portion 81 to the columnar portion 84c of the second large-diameter portion 84. Also, the slit 86 extends through the distal end portion 81 in a direction perpendicular to the axial direction of the distal end portion 81. That is, in FIG. 3A and FIG. 3B, the slit 86 extends through the distal end portion 81 in the left-right direction. In this embodiment, since the slit 86 has the depth to the second large-diameter portion 84, in FIG. 3A, the slit 86 also extends through the first large-diameter portion 83 and the second large-diameter portion 84 in the left-right direction. Accordingly, the slit 86 extends through the sealing pin 80 in the left-right direction in FIG. 3A and FIG. 3B, and a portion of the sealing pin 80 extending from the distal end surface 81a to the bottom surface 86a is divided into a first portion 80a and a second portion 80b (see FIG. 3C). The first and second portions 80a and 80b each have a side surface 86b facing the slit 86. The side surfaces 86b, 86b face one another in the up-down direction in FIG. 3B and FIG. 3C. The side surfaces 86b, 86b are flat surfaces parallel to the axial direction of the sealing pin 80. The distance between the side surfaces 86b, 86b is larger than the width of the sensor element 20. Since the slit 86 extends through the sealing pin 80 in the left-right direction in FIG. 3A and FIG. 3B, the sealing pin 80 does not have side surfaces facing one another in the left-right direction. The bottom surface 86a of the slit 86 has a curved surface. More specifically, the bottom surface 86a has the same shape as the shape of an inner peripheral surface of a semicircular cylinder. The axial direction of the curved surface of the bottom surface 86a extends in the extending direction (the left-right direction in FIG. 3A, FIG. 3B) of the slit 86.

A sealing step using the sealing pin 80 is described. First, the sealing pin 80 is lowered from above the pre-sealing assembly 14, and the distal end surface 81a of the sealing pin 80 is brought into contact with the metal ring 46 (FIG. 2C). At this time, the sealing pin 80 is lowered in a state in which the side surfaces 86b, 86b of the sealing pin 80 face one another in the thickness direction of the sensor element 20. In other words, the sealing pin 80 is lowered in a state in which the extending direction (the left-right direction in FIG. 3A and FIG. 3B) of the slit 86 is parallel to the width direction of the sensor element 20. Accordingly, a portion of the sensor element 20 protruding upward from the metal ring 46 is inserted into the slit 86 of the sealing pin 80. Hence, the distal end surface 81a can be brought into contact with the metal ring 46 while the sealing pin 80 avoids the sensor element 20.

Then, the sealing pin 80 is further lowered. Accordingly, the distal end portion 81 is gradually inserted into the inner cylinder 43 in the axial direction, and the distal end portion 81 presses the sealants 45a and 45b via the metal ring 46. Then, the sealants 45a and 45b are compressed by the pressing force from the sealing pin 80, and the sealing is provided between the inner peripheral surface of the cylindrical body 41 and the sensor element 20 (FIG. 2D). Thus, the element sealing body 40 is produced, and the pre-sealing assembly 14 becomes the assembly 15. As illustrated in FIG. 2D and FIG. 4, when the sealing pin 80 presses the sealants 45a and 45b, the sensor element 20 is inserted into the slit 86, and the distal end portion 81 is inserted into the inner cylinder 43. Accordingly, the distal end portion 81 can press the sealants 45a and 45b while the sealing pin 80 avoids the sensor element 20.

As the distal end portion 81 has a smaller outer diameter, the distal end portion 81 can be more easily inserted into the inner cylinder 43. As the distal end portion 81 has a larger outer diameter, the strength of the distal end portion 81 is increased. Therefore, it is preferable to determine the outer diameter of the distal end portion 81 with regard to these matters. For example, the difference between the outer diameter of the distal end portion 81 and the inner diameter of the inner cylinder 43 may be in a range from 0.1 mm or larger to 2.0 mm or smaller. Also, as the distance between the side surfaces 86b, 86b is larger, the sealing pin 80 can more easily avoid the sensor element 20 in the sealing step, and breakage of the sensor element 20 can be more likely suppressed. As the distance between the side surfaces 86b, 86b is smaller, the strength of the distal end portion 81 can be more likely increased. Hence, it is preferable to determine the distance between the side surfaces 86b, 86b with regard to these matters. For example, the distance between the side surfaces 86b, 86b may be larger than the thickness of the sensor element 20 by 1.0 mm or more. Also, the distance between the side surfaces 86b, 86b may be smaller than the width of the sensor element 20. Also, the depth of the slit 86 is determined so that the upper end of the sensor element 20 does not contact the bottom surface 86a at completion of the sealing step, that is, in a state in which the sealing pin 80 is the most lowered (FIG. 2D). For example, the depth of the slit 86 may be determined so that the distance between the upper end of the sensor element 20 and the bottom surface 86a in FIG. 2D is in a range from 5 mm or larger to 15 mm or smaller.

When the sealing step is performed, a portion of the inner cylinder 43 located at a side surface of the sealant 45b and a portion thereof at the expanded pipe portion 43*b* side with respect to the metal ring 46 are swaged and hence the reduced-diameter portions 43*c* and 43*d* are formed (FIG. 2E). By forming the reduced-diameter portion 43*d*, the pressing force between the metal ring 46 and the bottom surface 42*b* of the main metal fitting 42 is securely kept. Also, by forming the reduced-diameter portion 43*c*, the sealing in the inner cylinder 43 and the fixture of the sensor element 20 become more secured. As illustrated in FIG. 2E, when the reduced-diameter portion 43*d* is formed in a state in which the sealing pin 80 is inserted into the inner cylinder 43, the outer diameter of the distal end portion 81 is set to be smaller than the inner diameter of the reduced-diameter portion 43*d*. The formation of the reduced-diameter portions 43*c* and 43*d* may be included in the sealing step.

After the assembly 15 is manufactured as described above, the gas sensor 10 is manufactured by using the assembly 15. Specifically, first, the protection cover 30 is formed by welding and fixing the inner protection cover 31 and the outer protection cover 32 to the main metal fitting 42, the assembly 15 is inserted into the nut 47, and the nut 47 is attached to the main metal fitting 42. Then, the lead wires 55 inserted through the rubber cap 57 and the connector 50 connected to the lead wires 55 are prepared, and the connector 50 is connected to the upper end side of the sensor element 20. Then, the lead wires 55, the rubber cap 57, the connector 50, and the upper side of the assembly 15 are inserted into the outer cylinder 48, the outer cylinder 48 is welded and fixed to the main metal fitting 42, and hence the gas sensor 10 illustrated in FIG. 1 is obtained.

Figure 6A:
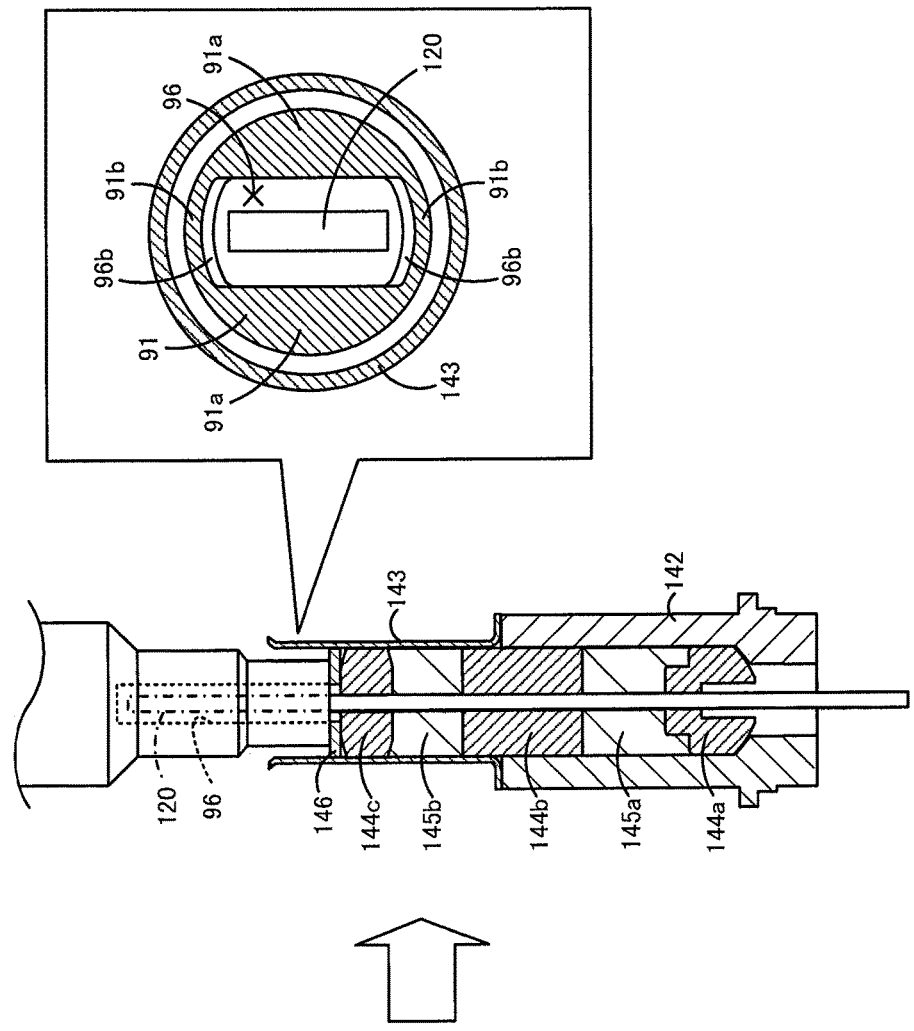
FIG. 6A and FIG. 6B are an explanatory view of a sealing step using a sealing pin 90 according to a comparative example.
Figure 6B:
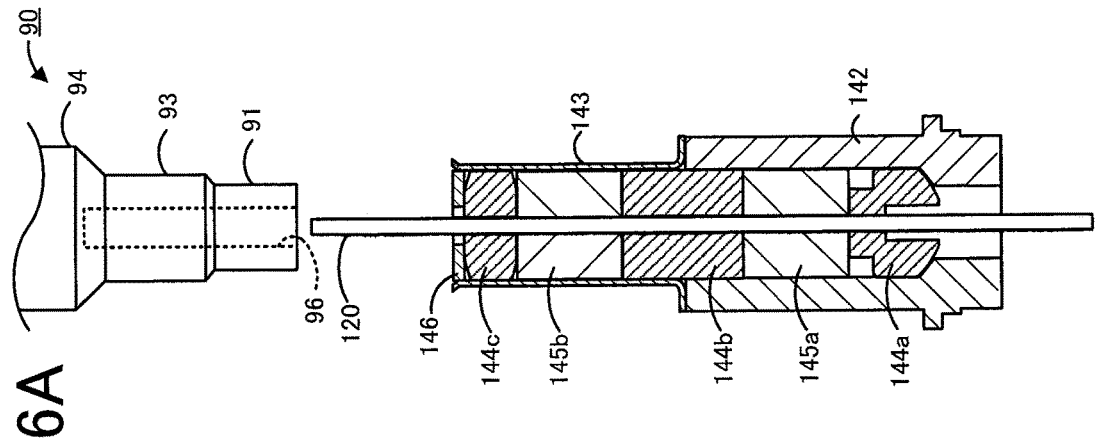

In the above-described method of manufacturing the gas sensor 10, when the above-described sealing step is performed, a stress is applied to the sealing pin 80 due to the press by the sealants 45*a* and 45*b*. At this time, since the sealing pin 80 has the slit 86 extending through the distal end portion 81 in the direction perpendicular to the axial direction of the distal end portion 81, the sealing pin 80 is unlikely broken as compared with a case where the sealing step is performed by using, for example, the sealing pin 90 according to the comparative example illustrated in FIGS. 6 and 7. The sealing pin 90 according to the comparative example has the insertion hole 96 instead of the slit 86 to avoid the sensor element 120. In this case, since the width of the sensor element 120 is larger than the thickness thereof, the insertion hole 96 has a shape with the long-side direction (the up-down direction of the insertion hole 96 in the partial section view in FIG. 6B) and the short-side direction (the left-right direction of the insertion hole 96 in the partial section view in FIG. 6B) in a section perpendicular to the axial direction of the sealing pin 90. Hence, the distal end portion 91 has the thick portions 91*a*, 91*a* facing one another in the short-side direction, and the thin portions 91*b*, 91*b* facing one another in the long-side direction. With the sealing pin 90 having such a shape, a stress is likely concentrated at the connection portion 91*c* between the thick portion 91*a* and the thin portion 91*b* of the distal end surface of the distal end portion 91 during the press, and the connection portion 91*c* is likely broken. In contrast, with the sealing pin 80 according to this embodiment, since the slit 86 extends through the distal end portion 81 in the direction perpendicular to the axial direction of the distal end portion 81, a portion corresponding to the thin portion 91*b* of the sealing pin 90 is not present, or the connection portion 91*c* is not present. Hence, the sealing pin 80 is more unlikely broken in the sealing step as compared with the sealing pin 90. Also, since the sealing pin 80 is unlikely broken, for example, when the sealing step is continuously performed and a plurality of assemblies 15 are manufactured, the frequency of replacement of the sealing pin 80 is decreased and the assemblies 15 can be efficiently manufactured.

Also, in this embodiment, the upper surface of the supporter 44*c* is inclined so as to be separated from the metal ring 46 more at the outer side in the radial direction. In a case where the supporter 44*c* has such a shape, when the sealing pin 90 according to the comparative example is used in the sealing step, a portion the metal ring 46 at the outer side in the radial direction is bent more by the sealing pin 90 so as to be located at the lower side in FIG. 6B. That is, the metal ring 46 is bent so as to extend along the inclination of the upper surface of the supporter 44*c*. Accordingly, a stress to the outer side in the radial direction is applied to the distal end portion 91 of the sealing pin 90 in the sealing step so as to expand the opening of the insertion hole 96. Hence, a stress is more likely concentrated at the connection portion 91*c*, and the sealing pin 90 is more likely broken at the connection portion 91*c*. In contrast, in a case where the sealing pin 80 is used in the sealing step, a stress to the outer side in the radial direction is likewise applied to the distal end portion 81; however, since the connection portion 91*c* at which a stress is likely concentrated is not present, the sealing pin 80 is unlikely broken. As described above, when the upper surface of the supporter 44*c* is inclined more to be separated from the metal ring 46 at the outer side in the radial direction, the sealing pin 90 is more likely broken, and therefore, the significance of using the sealing pin 80 according to this embodiment increases.

The connection portion 91*c* may be omitted by eliminating the difference between the thick portion 91*a* and the thin portion 91*b* in such a manner that the insertion hole 96 of the sealing pin 90 has a circular section perpendicular to the axial direction. However, in this case, it is necessary to determine the inner diameter of the insertion hole 96 in accordance with the width of the sensor element 120. The distal end portion 91 has to be entirely thin and the sealing pin 90 is likely broken. Owing to this, as compared with the sealing pin 90 having such a shape, the sealing pin 80 according to this embodiment is unlikely broken in the sealing step.

With the sealing pin 80 according to the above-described embodiment, since the slit 86 extends through the distal end portion 81 in the direction perpendicular to the axial direction of the distal end portion 81, the sealing pin 80 is unlikely broken in the sealing step.

Also, since the bottom surface 86*a* is a curved surface, stress concentration at a portion of the bottom surface 86*a* can be suppressed, and the sealing pin 80 is more unlikely broken. For example, if the bottom surface 86*a* is a flat surface, a stress may be likely concentrated at the boundary between the bottom surface 86*a* and the side surface 86*b* of the slit 86. Since the bottom surface 86*a* is a curved surface, such stress concentration can be suppressed, and the sealing pin 80 is unlikely broken.

Further, since the rising portion 82*a* rising from the distal end portion 81 to the first large-diameter portion 83 is the curved surface, the sealing pin 80 is more unlikely broken. As compared with, for example, a case where the first step surface 82 has a shape of rising perpendicularly from the outer peripheral surface of the distal end portion 81 (a case where the first step surface 82 is perpendicular to the axial direction of the sealing pin 80), a stress is unlikely concentrated at the rising portion 82*a* and hence the sealing pin 80 is more unlikely broken.

Furthermore, since the corner portion 81*b* at the distal end of the distal end portion 81 facing the slit 86 is chamfered, as compared with a case without being chamfered, breakage of the sensor element 20 by the distal end portion 81 can be suppressed when the sensor element 20 is inserted into the slit 86 in the sealing step.

Moreover, the slit 86 has a depth from the distal end portion 81 to the second large-diameter portion 84, and the bottom surface 86a of the slit 86 is located in the second large-diameter portion 84. Hence, for example, as compared with a case where the depth of the slit 86 reaches only the distal end portion 81 or the first large-diameter portion 83, the diameter of the slit 86 of the sealing pin 80 near the bottom portion 86a, or more specifically, a portion near the bottoms of the first and second portions 80a and 80b divided by the slit 86 becomes large. A stress is applied to the portion near the bottoms of the first and second portions 80a and 80b in the sealing step. However, since the diameter of the portion near the bottoms is large, breakage of this portion can be suppressed. In particular, if the upper surface of the supporter 44c is inclined so as to be separated from the metal ring 46 more at the outer side in the radial direction like this embodiment, a stress to the outer side in the radial direction is applied to the distal end portion 81 as described above. Hence, a stress is likely applied to the portion near the bottoms of the first and second portions 80a and 80b. Accordingly, it is significant to locate the bottom surface 86a in the second large-diameter portion 84 and to increase the diameter of the portion near the bottoms of the first and second portions 80a and 80b.

The present invention is not limited to the above-described embodiment, and may be implemented in various aspects as long as belonging to the technical scope of the present invention.

For example, while the bottom surface 86a of the slit 86 is located in the columnar portion 84c of the second large-diameter portion 84 in the above-described embodiment, it is not limited thereto. The bottom surface 86a may be located in the reduced-diameter portion 84a of the second large-diameter portion 84. Also, the bottom surface 86a may be located in the distal end portion 81 or in the second large-diameter portion 84. However, since the diameter of the portion near the bottoms of the first and second portions 80a and 80b is preferably large, the bottom surface 86a is preferably located in the second large-diameter portion 84.

While the second large-diameter portion 84 has a diameter larger than that of the first large-diameter portion 83 in the above-described embodiment, it is not limited thereto. The second large-diameter portion 84 may have any diameter as long as the diameter is larger than that of the distal end portion 81. For example, the first large-diameter portion 83 may have the same diameter as that of the second large-diameter portion 84. In this case, it may be considered that the second large-diameter portion 84 also serves as the first large-diameter portion 83.

While the corner portion 81b is chamfered in the above-described embodiment, the corner portion 81b may not be chamfered. Also, while the rising portion 82a has a curved surface in the above-described embodiment, it is not limited thereto. For example, the first step surface 82 may have a shape rising perpendicularly from the outer peripheral surface of the distal end portion 81, and the rising portion 82a may be a flat surface. Also, while the bottom surface 86a is the curved surface, it is not limited thereto, and may be, for example, a flat surface.

While the sealing pin 80 includes the first large-diameter portion 83 and the second large-diameter portion 84 in the above-described embodiment, at least one of these may be omitted. For example, the entirety of the sealing pin 80 may have the same diameter as that of the distal end portion 81. However, since the strength of the sealing pin 80 is increased by making the diameter of the portion of the sealing pin 80 other than the distal end portion 81 that is inserted into the inner cylinder 43 in the sealing step larger than the diameter of the distal end portion 81, the sealing pin 80 preferably has the distal end portion 81, and a large-diameter portion having a diameter larger than that of the distal end portion 81 (for example, the first large-diameter portion 83 and the second large-diameter portion 84).

Figure 5:
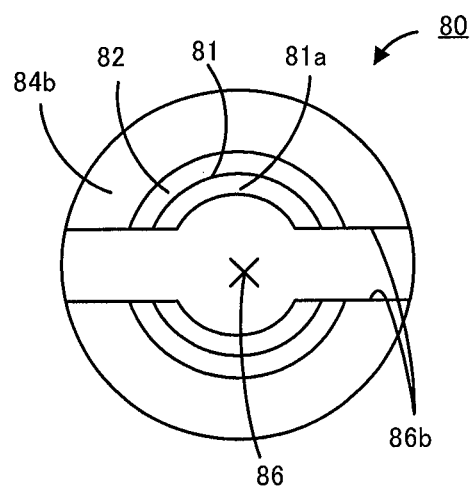
FIG. 5 is an explanatory view of the sealing pin 80 according to a modification.

While the side surfaces 86b, 86b are flat surfaces in the above-described embodiment, it is not limited thereto, and the side surfaces 86b, 86b may at least partly have curved surfaces. For example, the side surfaces 86b, 86b may partly have curved surfaces like a sealing pin 80 according to a modification illustrated in FIG. 5. A slit 86 of the sealing pin 80 according to this modification is in a state in which a hole being coaxial with the central axis of the sealing pin 80 and having a diameter smaller than that of the distal end portion 81 is added to the slit 86 illustrated in FIG. 3A to 3C. Hence, in the sealing pin 80 according to the modification in FIG. 5, a distal end surface 81a of a distal end portion 81 has an arcuate shape unlike FIG. 3A to 3C. Even when the slit 86 has such a shape, similarly to the above-described embodiment, since the slit 86 extends through the distal end portion 81 in the direction perpendicular to the axial direction of the distal end portion 81, an advantageous effect that the sealing pin 80 is unlikely broken in the sealing step is obtained.

In the above-described embodiment, a hole may be made in a portion of the bottom surface 86a of the slit 86. For example, a hole extending in the central axis of the sealing pin 80 may be additionally made in the bottom surface 86a of the slit 86. In this case, the upper end of the sensor element 20 may be inserted into this hole in the sealing step. In this case, even if the distance from the distal end surface 81a to the bottom surface 86a is smaller than the distance from the upper surface of the metal ring 46 to the upper end of the sensor element 20 in FIG. 2D, the sealing pin 80 can avoid the sensor element 20 in the sealing step.

Also, while the upper surface of the supporter 44c in FIG. 1 is inclined so as to be separated from the metal ring 46 more at the outer side in the radial direction in the above-described embodiment, it is not limited thereto. For example, the upper surface of the supporter 44c may be a flat surface perpendicular to the axial direction of the cylindrical body 41.

While the element sealing body 40 includes the three supporters 44a to 44c and the two sealants 45a and 45b in the above-described embodiment, it is only required to provide sealing between the inside of the cylindrical body 41 and the sensor element 20 and to fix the sensor element 20, and the numbers of the supporters 44a to 44c and the sealants 45a and 45b may be appropriately changed. For example, the element sealing body 40 may not include the supporter 44b, and a single sealant may be provided between the supporter 44a and the supporter 44c. Also, members other than the ceramic members and the green compacts may be used as long as sealing can be provided between the inside of the cylindrical body 41 and the sensor element 20 and the sensor element 20 can be fixed. Also, while the cylindrical body 41 is the member obtained by welding the main metal fitting 42 and the inner cylinder 43 to one another according to the above-described embodiment, it is not limited thereto, and the cylindrical body 41 may be a member obtained by integrally forming a member corresponding to the main metal fitting 42 and a member corresponding to the inner cylinder 43.

The order of attaching the respective components in the method of manufacturing the gas sensor 10 according to the above-described embodiment may be appropriately changed. For example, the nut 47 may be attached to the main metal fitting 42 in the sealing preparation step.

EXAMPLES

Examples in which the sealing pin and the assembly were fabricated are described below. It is to be noted that the present invention is not limited to the following examples.

Example 1

The sealing pin 80 illustrated in FIG. 3A to 3C was fabricated as Example 1. The material of the sealing pin 80 was SKD11, and the hardness after quenching and tempering was set in a range of HRC 60 to 63. Regarding the sealing pin 80, the diameter of the distal end portion 81 other than the first step surface 82 was 7.4 mm, the length of the distal end portion 81 in the axial direction was 8 mm, and the corner portion 81*b* was C chamfered by 0.5 mm (C0.5). The rising portion 82*a* was a curved surface with a radius of 1 mm (R1). Regarding the first large-diameter portion 83, the diameter was 8.97 mm, and the length in the axial direction was 8.5 mm. Regarding the second large-diameter portion 84, the diameter of the columnar portion 84*c* was 14 mm, and the inclination angle of the second step surface 84*b* was 45° with respect to the axial direction. Regarding the slit 86, the distance from the distal end surface 81*a* to the vertex of the bottom surface 86*a* (the right end in FIG. 3C of the bottom surface 86*a*) in the axial direction was 21.5 mm, and the distance between the side surfaces 86*b*, 86*b* was 3 mm.

Comparative Example 1

The sealing pin 90 illustrated in FIGS. 7A to 7C was fabricated as Comparative example 1. The material of the sealing pin 90 was SKD11, and the hardness after quenching and tempering was set in a range of HRC 57 to 59. Regarding the sealing pin 90, the diameter of the distal end portion 91 was 7.7 mm, the length in the axial direction of the distal end portion 91 (a length not including a step portion between the distal end portion 91 and the first large-diameter portion 93) was 7 mm, and the inclination angle of the step surface between the distal end portion 91 and the first large-diameter portion 93 was 45° with respect to the axial direction. The diameter of the first large-diameter portion 93 was 8.97 mm. The sum of the lengths in the axial direction of the distal end portion 91 and the first large-diameter portion 93 (including the step portion) was 18.5 mm. Regarding the second large-diameter portion 94, the diameter was 14 mm, and the inclination angle of the step surface between the first large-diameter portion 93 and the second large-diameter portion 94 was 45° with respect to the axial direction. Regarding the insertion hole 96, the dimensions of the opening at the distal end surface of the distal end portion 91 were 7.2 mm in the long-side direction, and 4.5 mm in the short-side direction. The depth of the insertion hole 96 was 20 mm. Portions of the side surfaces 96*b*, 96*b* extending from the distal end of the distal end portion 91 by 10 mm in the axial direction were inclined, and the distance between portions of the side surfaces 96*b*, 96*b* that are not inclined was 6.2 mm.

(Durability Test on Sealing Pin)

The assembly 15 in FIG. 1 was fabricated by performing the above-described sealing preparation step and sealing step by using the sealing pin 80 according to Example 1. The material of the main metal fitting 42 was SUS430, and the material of the inner cylinder 43 was SUS430. The inner diameter of the inner cylinder 43 was 9 mm. The material of the metal ring 46 was SUS304. The supporters 44*a* to 44*c* each were a sintered compact of ceramics made of alumina. The sealants 45*a* and 45*b* were, for example, green compacts formed by shaping talc powder. Regarding the sensor element 20, the thickness was 1.45 mm and the width was 4.25 mm. In the sealing step, the sealants 45*a* and 45*b* were pressed by applying a load of 5.4±0.42 kN on the sealing pin 80. The sealing preparation step and the sealing step were repeated, and the number of times of using the sealing pin 80 without being broken was measured. Likewise, the sealing preparation step and the sealing step were repeated also for the sealing pin 90 according to Comparative example 1, and the number of times of using the sealing pin 90 without being broken was measured.

As the result of the durability test, the sealing pin 90 was broken when the number of times of use was about 100,000 times. In contrast, the sealing pin 80 was not broken even when the number of times of use reached 600,000 times. Also, it was recognized that, in the assembly 15 manufactured by using the sealing pin 80, the sealing was provided between the inner peripheral surface of the cylindrical body 41 and the sensor element 20, and the quality had no problem. This was recognized by ensuring that there was no leak of gas in the cylindrical body 41 in FIG. 1 in the area between the upper end side and the lower end side of the sensor element 20.

The present application claims priority from Japanese Patent Application No. 2017-070977 filed on Mar. 31, 2017, the entire contents of which are incorporated herein by reference.

What is claimed is:

1. A sealing pin usable in a sealing step during manufacture of an assembly, the assembly including a cylindrical body, a sensor element having a long plate shape and penetrating through inside of the cylindrical body in an axial direction, and a sealant providing sealing between an inner peripheral surface of the cylindrical body and the sensor element, the sealing step pressing the sealant in the axial direction and hence compressing the sealant, the sealing pin comprising:

a distal end portion that is inserted into the cylindrical body and that presses the sealant in the sealing step; and
   a slit that is provided to allow the sealing pin to avoid the sensor element when the sealing pin is inserted into the cylindrical body, and that extends through the distal end portion in a direction perpendicular to an axial direction of the distal end portion, and that has a slit width larger than a thickness of the sensor element.

2. The sealing pin according to claim 1,
   wherein the slit has a bottom surface, the bottom surface having a curved surface.

3. The sealing pin according to claim 1, further comprising:
   a first large-diameter portion that is connected to the distal end portion, and that has a diameter larger than a diameter of the distal end portion, and
   wherein a step surface between the distal end portion and the first large-diameter portion has a rising portion rising from the distal end portion to the first large-diameter portion, the rising portion having a curved surface.

4. The sealing pin according to claim 1,
wherein a corner portion of a distal end of the distal end portion, facing the slit, is chamfered.

5. The sealing pin according to claim 1, further comprising:
a second large-diameter portion having a diameter larger than the diameter of the distal end portion,
wherein the slit has a depth from the distal end portion to the second large-diameter portion, and wherein a bottom surface of the slit is located in the second large-diameter portion.

6. A method during manufacturing of a gas sensor including using a sealing pin during assembly of the gas sensor, the gas sensor including a cylindrical body, a sensor element having a long plate shape and penetrating through inside of the cylindrical body in an axial direction, and a sealant providing sealing between an inner peripheral surface of the cylindrical body and the sensor element, the method comprising:

a sealing preparation step of inserting the sensor element to penetrate through inside of the cylindrical body in the axial direction, and arranging the sealant between the inner peripheral surface of the cylindrical body and the sensor element to obtain a pre-sealing assembly; and a sealing step of inserting a distal end portion of the sealing pin into the cylindrical body in the axial direction of the gas sensor to press the sealant between the inner peripheral surface of the cylindrical body and the sensor element, wherein the sealing pin has a slit in the distal end portion of the sealing pin to allow the sealing pin to avoid the sensor element when the sealing pin is inserted into the cylindrical body during the assembly of the gas sensor, the sealing pin extending through the distal end portion in a direction perpendicular to an axial direction of the distal end portion, and the slit having a width larger than a thickness of the sensor element.

* * * * *